United States Patent
Wang et al.

(10) Patent No.: US 10,884,156 B2
(45) Date of Patent: Jan. 5, 2021

(54) IMAGE PROCESSING METHOD, DEVICE, AND COMPUTER READABLE STORAGE MEDIUM

(71) Applicant: NUCTECH COMPANY LIMITED, Beijing (CN)

(72) Inventors: Qi Wang, Beijing (CN); Bicheng Liu, Beijing (CN); Guangming Xu, Beijing (CN)

(*) Notice: Subject to any disclaimer, the term of this patent is extended or adjusted under 35 U.S.C. 154(b) by 119 days.

(21) Appl. No.: 16/232,082

(22) Filed: Dec. 26, 2018

(65) Prior Publication Data

US 2019/0196051 A1 Jun. 27, 2019

(30) Foreign Application Priority Data

Dec. 26, 2017 (CN) .......................... 2017 1 1434581

(51) Int. Cl.
| | | |
|---|---|---|
| G06K 9/00 | (2006.01) | |
| G01V 5/00 | (2006.01) | |
| G06T 5/20 | (2006.01) | |
| G01N 23/04 | (2018.01) | |
| G06T 3/40 | (2006.01) | |

(52) U.S. Cl.
CPC ........... *G01V 5/0016* (2013.01); *G01N 23/04* (2013.01); *G06T 3/4046* (2013.01); *G06T 5/20* (2013.01); *G06T 2207/10116* (2013.01)

(58) Field of Classification Search
None
See application file for complete search history.

(56) References Cited

U.S. PATENT DOCUMENTS

| | | | |
|---|---|---|---|
| 8,538,200 B2 * | 9/2013 | Wang | G06T 3/4053 345/582 |
| 9,324,133 B2 | 4/2016 | Choudhury | |

(Continued)

FOREIGN PATENT DOCUMENTS

| | | |
|---|---|---|
| CN | 101900694 A | 12/2010 |
| CN | 101900696 A | 12/2010 |

(Continued)

OTHER PUBLICATIONS

"Accurate Image Super-Resolution Using Very Deep Convolutional 2 Networks", Jiwon Kim et al, 2016 IEEE Conference on Computer Vision and Pattern Recognition (CVPR), p. 1646-1654.

(Continued)

*Primary Examiner* — Shervin K Nakhjavan
(74) *Attorney, Agent, or Firm* — Kilpatrick Townsend & Stockton, LLP

(57) ABSTRACT

The present disclosure provides an image processing method, device, and computer readable storage medium, relating to the field of image processing technology, the method includes: acquiring a first undersampled image to be processed; and reconstructing, according to a mapping relationship between an undersampled image and a normally sampled original image, the first undersampled image to a corresponding first original image, wherein the mapping relationship is obtained by training a machine learning model with a second undersampled image and a normally sampled second original image corresponding to the second undersampled image as training samples.

20 Claims, 5 Drawing Sheets

(56) References Cited

U.S. PATENT DOCUMENTS

| | | | | |
|---|---|---|---|---|
| 2008/0292163 | A1* | 11/2008 | DiBella | G01R 33/561 382/131 |
| 2009/0252431 | A1* | 10/2009 | Lu | H04N 19/85 382/255 |
| 2010/0124383 | A1* | 5/2010 | Wang | G06T 3/4053 382/299 |
| 2011/0211765 | A1* | 9/2011 | Nagumo | G06T 5/003 382/254 |
| 2013/0028538 | A1* | 1/2013 | Simske | 382/300 |
| 2013/0343625 | A1* | 12/2013 | Samsonov | G01R 33/5611 382/131 |
| 2014/0097845 | A1* | 4/2014 | Liu | G01R 33/5611 324/322 |
| 2015/0125061 | A1 | 5/2015 | Holt | |
| 2015/0160319 | A1* | 6/2015 | Choi | G01R 33/5611 324/309 |
| 2015/0287223 | A1* | 10/2015 | Bresler | G06T 11/006 382/131 |
| 2017/0053402 | A1* | 2/2017 | Migukin | G06T 7/0012 |
| 2017/0154413 | A1* | 6/2017 | Yu | G06K 9/6247 |
| 2017/0200258 | A1* | 7/2017 | Zhao | G06T 3/4053 |
| 2017/0213355 | A1* | 7/2017 | Hujsak | H01J 37/222 |
| 2017/0309019 | A1* | 10/2017 | Knoll | G06T 11/006 |
| 2019/0035117 | A1* | 1/2019 | Xing | G06T 5/20 |
| 2019/0041482 | A1* | 2/2019 | Huang | G01R 33/5611 |
| 2019/0101605 | A1* | 4/2019 | Hyun | G01R 33/5611 |
| 2019/0122075 | A1* | 4/2019 | Zhang | G06K 9/6255 |
| 2019/0147589 | A1* | 5/2019 | Zhou | G06K 9/6292 382/131 |
| 2019/0172230 | A1* | 6/2019 | Mailhe | G06T 5/002 |

FOREIGN PATENT DOCUMENTS

| | | |
|---|---|---|
| CN | 105374020 A | 3/2016 |
| CN | 105405098 A | 3/2016 |
| CN | 106127684 A | 11/2016 |
| CN | 106204449 A | 12/2016 |
| CN | 106780333 A | 5/2017 |
| CN | 106886054 A | 6/2017 |
| EP | 2437050 A1 | 4/2012 |
| EP | 2889644 A2 | 7/2015 |
| WO | 2011161558 A1 | 12/2011 |

OTHER PUBLICATIONS

The first Office Action of Chinese Application No. 201711434581.X.

Chao Dong et al., "Image Super-Resolution Using Deep Convolutional Networks", IEEE Transactions on Pattern Analysis and Machine Intelligence. vol. 38, No. 2, Feb. 2016, 13 Pages.

European Search Report dated Apr. 17, 2019 in the corresponding EP application (application No. 18215426.0).

* cited by examiner

IMAGE PROCESSING METHOD, DEVICE, AND COMPUTER READABLE STORAGE MEDIUM

CROSS-REFERENCES TO RELATED APPLICATIONS

The present disclosure claims priority to China Patent Application No. 201711434581.X filed on Dec. 26, 2017, the disclosure of which is incorporated by reference herein in its entirety.

FIELD

The present application relates to an image processing method, device, and computer readable storage medium.

BACKGROUND

The use of containers or vehicles for smuggling of contraband such as guns, ammunition, drugs, explosives and even weapons of mass destruction or radioactive dispersion devices, has become an international public nuisance that disturbs governments and disturbs the normal order of international cargo transportation. Thus, security inspection of containers or vehicles is a topic of common concern all over the world.

X-ray imaging technology is the most basic and earliest widely used technology in the field of contraband inspection, and is currently the most widely used technology for container or vehicle inspection.

SUMMARY

According to one aspect of embodiments of the present disclosure, an image processing method is provided. The method comprises: acquiring a first undersampled image to be processed; and reconstructing, according to a mapping relationship between an undersampled image and a normally sampled original image, the first undersampled image to a corresponding first original image, wherein the mapping relationship is obtained by training a machine learning model with a second undersampled image and a normally sampled second original image corresponding to the second undersampled image as training samples.

In some embodiments, the image processing method further comprises: downsampling the second original image to obtain the second undersampled image; training the machine learning model with the second undersampled image and the second original image as training samples to obtain the mapping relationship.

In some embodiments, downsampling the second original image to obtain the second undersampled image comprises: downsampling the second original image to obtain a second downsampled image; upsampling the second downsampled image to obtain a second upsampled image of the same size as the second original image, wherein the second upsampled image is used as the second undersampled image.

In some embodiments, reconstructing the first undersampled image to a corresponding first original image comprises: upsampling the first undersampled image to obtain a first upsampled image of the same size as the first original image, wherein the first upsampled image is used as a third undersampled image; reconstructing the third undersampled image to a corresponding third original image according to the mapping relationship, wherein the third original image is used as the first original image.

In some embodiments, training the machine learning model with the second undersampled image and the second original image as training samples to obtain the mapping relationship comprises: dividing the second undersampled image into a plurality of undersampled image blocks; dividing the second original image into a plurality of original image blocks corresponding to the plurality of undersampled image blocks one to one, wherein each original image block has a same size as a corresponding undersampled image block; training the machine learning model with the plurality of undersampled image blocks and the plurality of original image blocks as training samples.

In some embodiments, training the machine learning model with the plurality of undersampled image blocks and the plurality of original image blocks as training samples comprises: processing each undersampled image block to determine a difference image block between the undersampled image block and a corresponding original image block; adding the difference image block to the undersampled image block to obtain a predicted image block; optimizing the machine learning model according to the predicted image block and the corresponding original image block until a difference between the predicted image block and the corresponding original image block satisfies a preset condition.

In some embodiments, downsampling the second original image comprises: augmenting the second original image to obtain at least one augmented image; downsampling the second original image and the augmented image to obtain more than one second undersampled image.

In some embodiments, the first undersampled image is obtained in the following manner: receiving, by a first group of detectors disposed opposite to a first emitter, rays emitted by the first emitter and penetrating cross sections along a second direction of a first detected object moving along a first direction; and generating the first undersampled image based on the rays received by the first group of detectors, wherein the first direction is perpendicular to the second direction, and the first group of detectors comprises one or more rows of first detectors; and the second original image is obtained in the following manner: receiving, by a second group of detectors disposed opposite to a second emitter, rays emitted by the second emitter and penetrating cross sections along a fourth direction of a second detected object moving along a third direction; and generating the second original image based on the rays received by the second group of detectors, wherein the third direction is perpendicular to the fourth direction, and the second group of detectors comprises one or more rows of second detectors.

In some embodiments, the first undersampled image has a size smaller than that of the first original image in the first direction; the second downsampled image has a size smaller than that of the second original image in the third direction.

In some embodiments, the first group of detectors comprises M1 rows of first detectors arranged in the first direction, wherein the distance between adjacent rows of first detectors is S1; the second group of detectors comprises M2 rows of second detectors arranged in the third direction, wherein the distance between adjacent rows of second detectors is S2; wherein $2 \leq M1 \leq M2$, $S1 = N \times S2$, and N is an integer greater than or equal to 2.

According to another aspect of embodiments of the present disclosure, an image processing device is provided. The image processing device comprises: an acquisition module for acquiring a first undersampled image to be processed; and a reconstruction module for reconstructing, according to a mapping relationship between an undersampled image and a normally sampled original image, the first undersampled image to a corresponding first original image, wherein the mapping relationship is obtained by training a machine learning model with a second undersampled image and a normally sampled second original image corresponding to the second undersampled image as training samples.

In some embodiments, the image processing device further comprises: a downsampling module for downsampling the second original image to obtain the second undersampled image; and a training module for training the machine learning model with the second undersampled image and the second original image as training samples to obtain the mapping relationship.

In some embodiments, the downsampling module is used for downsampling the second original image to obtain a second downsampled image; the image processing device further comprises: a second upsampling module for upsampling the second downsampled image to obtain a second upsampled image of the same size as the second original image, wherein the second upsampled image is used as the second undersampled image.

In some embodiments, the image processing device further comprises: a first upsampling module for upsampling the first undersampled image to obtain a first upsampled image of the same size as the first original image, wherein the first upsampled image is used as a third undersampled image; the reconstruction module is used for reconstructing the third undersampled image to a corresponding third original image according to the mapping relationship, wherein the third original image is used as the first original image.

In some embodiments, the training module is used for: dividing the second undersampled image into a plurality of undersampled image blocks; dividing the second original image into a plurality of original image blocks corresponding to the plurality of undersampled image blocks one to one, wherein each original image block has a same size as a corresponding undersampled image block; training the machine learning model with the plurality of undersampled image blocks and the plurality of original image blocks as training samples.

In some embodiments, the training module is used for: processing each undersampled image block to determine a difference image block between the undersampled image block and a corresponding original image block; adding the difference image block to the undersampled image block to obtain a predicted image block; optimizing the machine learning model according to the predicted image block and the corresponding original image block until a difference between the predicted image block and the corresponding original image block satisfies a preset condition.

In some embodiments, the downsampling module is used for augmenting the second original image to obtain at least one augmented image; downsampling the second original image and the augmented image to obtain more than one second undersampled image.

In some embodiments, the first undersampled image is obtained in the following manner: receiving, by a first group of detectors disposed opposite to a first emitter, rays emitted by the first emitter and penetrating cross sections along a second direction of a first detected object moving along a first direction; and generating the first undersampled image based on the rays received by the first group of detectors, wherein the first direction is perpendicular to the second direction, and the first group of detectors comprises one or more rows of first detectors; and the second original image is obtained in the following manner: receiving, by a second group of detectors disposed opposite to a second emitter, rays emitted by the second emitter and penetrating cross sections along a fourth direction of a second detected object moving along a third direction; and generating the second original image based on the rays received by the second group of detectors, wherein the third direction is perpendicular to the fourth direction, and the second group of detectors comprises one or more rows of second detectors.

In some embodiments, the first undersampled image has a size smaller than that of the first original image in the first direction; the second downsampled image has a size smaller than that of the second original image in the third direction.

In some embodiments, the first group of detectors comprises M1 rows of first detectors arranged in the first direction, wherein the distance between adjacent rows of first detectors is S1; the second group of detectors comprises M2 rows of second detectors arranged in the third direction, wherein the distance between adjacent rows of second detectors is S2; wherein $2 \leq M1 \leq M2$, $S1=N \times S2$, and N is an integer greater than or equal to 2.

According to still another aspect of embodiments of the present disclosure, an image processing device is provided. The image processing device comprises: a memory; and a processor coupled to the memory, the processor is configured to, based on instructions stored in the memory, implement the image processing method according to any one of the above embodiments.

According to yet another aspect of embodiments of the present disclosure, a computer-readable storage medium on which computer program instructions are stored is provided. The instructions, when executed by a processor, implement the image processing method according to any one of the above embodiments.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure can be understood more clearly from the following detailed description with reference to the accompanying drawings, in which.

Figure 1:
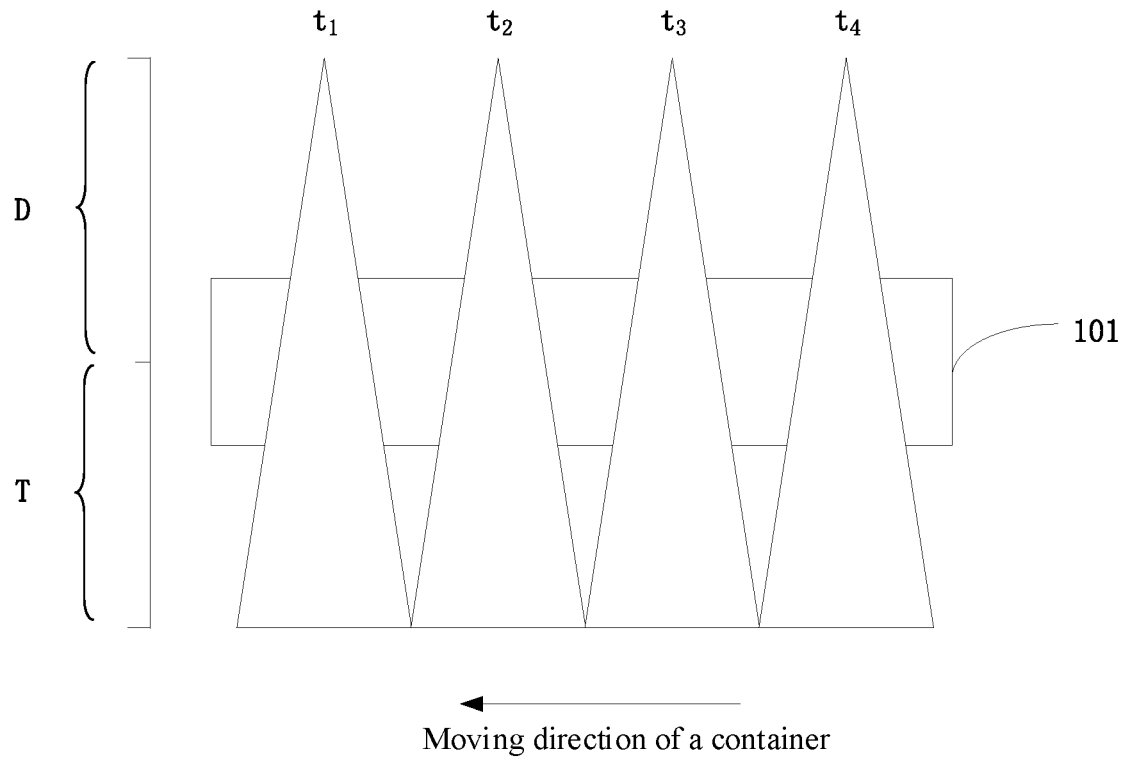
FIG. 1 is a schematic view showing a scene generating an undersampled image.

It should be understood that the dimensions of the various parts shown in the accompanying drawings are not drawn according to the actual scale. In addition, the same or similar reference signs are used to denote the same or similar components.

DETAILED DESCRIPTION OF THE INVENTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "have" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or between the specific component and the second component. When it is described that a specific part is connected to other parts, the specific part may be directly connected to the other parts without an intervening part, or not directly connected to the other parts with an intervening part.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and device known to those of ordinary skill in the relevant art may not be discussed in detail, but where appropriate, these techniques, methods, and devices should be considered as part of this specification.

In a typical dual-energy X-ray inspection system, a X-ray source (for example, an electron linear accelerator) alternately produces X-rays of two different energies at very high frequencies, called high-energy X-ray and low-energy X-ray. The two types of X-rays alternately pass through a slit collimator to form a fan-shaped X-ray beam, respectively. The two types of fan-shaped X-ray beams alternately penetrate a cross section of a detected object from one side of the detected object, and are sequentially received by detectors located on the other side of the detected object to generate image data. When the detected object passes through the fan-shaped X-ray beams, a series of cross sections of the detected object can be scanned by the fan-shaped X-ray beams sequentially, thus high-energy and low-energy X-ray transmission images of the entire detected object can be formed.

In order to scan all areas of the detected object, the moving speed v of the detected object and the frequency f of the X-rays emitted by a X-ray source should satisfy the following formula:

$$\frac{v}{f} = N \times \text{pitch} \times \frac{D}{D+T}$$

Here, N is the number of rows of detectors, pitch is the distance between adjacent rows of detectors, D is the distance from the X-ray source to the detected object, and T is the distance from the detected object to the detectors.

When the moving speed of the detected object is too large or the frequency at which the X-ray source emits X-rays is too small, undersampled images will be obtained. FIG. 1 is a schematic view showing a scene generating an undersampled image. As shown in FIG. 1, times t1, t2, t3, and t4 are X-ray emission times. Part of the detected object 101 cannot be scanned by X-rays between adjacent X-ray emission times (for example, time t1 and time t2), which results in the generation of an undersampled image. An undersampled image not only loses information about the detected object, but also does not match the actual shape of the item in the detected object. For example, a circular wheel in the detected object may be elliptical in the resulting undersampled image.

The quick inspection system is one of the dual energy X-ray inspection systems. In quick inspection, the quick inspection system does not move, and the detected object (such as a vehicle) directly passes through a passage of the quick inspection system, therefore the passing rate of the detected object is high. However, since the detected object moves at a faster speed, the X-ray source needs to emit X-ray at a very high frequency to avoid obtaining an undersampled image. However, due to hardware limitations, the X-ray emission frequency of the X-ray source cannot be increased without limitation, which limits the moving speed of the detected object and reduces the passing rate of the detected object.

For an undersampled image, a traditional processing approach is to reconstruct, by interpolation, the undersampled image to an image with a same size as a normally sampled image. However, images reconstructed by interpolation are quite different from normally sampled images as they are usually too smooth and accompanied by jagged artifacts.

Therefore, the present disclosure proposes the following technical solutions.

Figure 2:
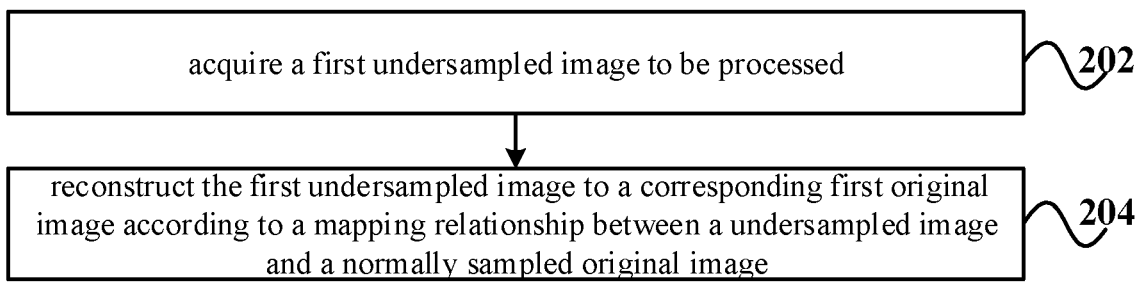
FIG. 2 is a schematic flow chart illustrating an image processing method according to some embodiments of the present disclosure.

FIG. 2 is a schematic flow chart illustrating an image processing method according to some embodiments of the present disclosure.

At step 202, a first undersampled image to be processed is acquired.

In some embodiments, the first undersampled image is obtained in the following manner: receiving, by a first group of detectors disposed opposite to a first emitter, rays emitted by the first emitter and penetrating cross sections along a second direction of a first detected object moving along a first direction; and generating the first undersampled image based on the rays received by the first group of detectors. Herein, the first direction may be substantially perpendicular to the second direction. The first group of detectors may comprise one or more rows of first detectors disposed in the first direction.

As some examples, the first detected object may comprise, but is not limited to, a container or a vehicle carrying a container or other item(s). As some examples, the rays may be, for example, X-rays, visible light, infrared rays, ultraviolet rays, or the like.

For example, the first detected object that is moving may be irradiated with single-energy X-rays or dual-energy X-rays to obtain a first undersampled image. However, it should be understood that the present disclosure is not limited thereto, and the first undersampled image may also be obtained in other manners.

At step 204, the first undersampled image is reconstructed to a corresponding first original image according to a mapping relationship between an undersampled image and a normally sampled original image. Herein, the mapping relationship is obtained by training a machine learning model with a second undersampled image and a normally sampled second original image corresponding to the second undersampled image as training samples.

In some embodiments, the second original image may be obtained in the following manner: the second original image is obtained in the following manner: receiving, by a second group of detectors disposed opposite to a second emitter, rays emitted by the second emitter and penetrating cross sections along a fourth direction of a second detected object moving along a third direction; and generating the second original image based on the rays received by the second group of detectors. The second undersampled image can be obtained by downsampling the second original image. Herein, the third direction may be substantially perpendicular to the fourth direction. The second group of detectors may comprise one or more rows of second detectors disposed in the third direction.

As some implementations, the first group of detectors may comprise M1 rows of first detectors arranged in the first direction, and the distance between adjacent rows of the first detectors is S1; the second group of detectors may comprise M2 rows of second detectors arranged in the third direction, and the distance between adjacent rows of the second detectors is S2. Herein, $2 \leq M1 \leq M2$, $S1 = N \times S2$, and N is an integer greater than or equal to 2.

For example, a machine learning model such as a dictionary learning model, a BP (Back Propagation) neural network model, or a convolutional neural network model may be trained based on one or more second undersampled images and one or more corresponding second original images to obtain a mapping relationship between an undersampled image and a normally sampled original images.

After being trained, the machine learning model may reconstruct any input undersampled image according to the trained mapping relationship to output a normally sampled original image corresponding to the undersampled image. Therefore, after being input a first undersampled image, the machine training model may reconstruct the first undersampled image according to the trained mapping relationship, and output a first original image corresponding to the first undersampled image accordingly.

In the above embodiment, a first undersampled image to be processed can be reconstructed to a corresponding first original image using the trained mapping relationship between an undersampled image and a normally sampled original image. The first original image obtained according to the method of the above embodiment is more accurate than that obtained according to conventional interpolation method.

Figure 3:
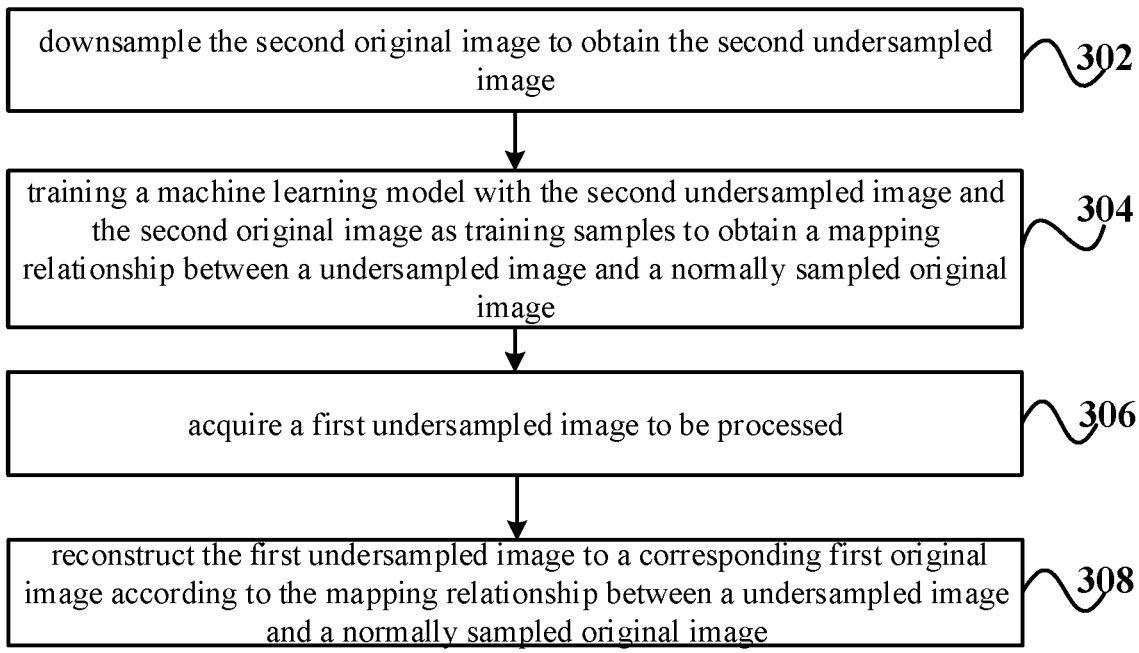
FIG. 3 is a schematic flow chart illustrating an image processing method according to other embodiments of the present disclosure.

FIG. 3 is a schematic flow chart illustrating an image processing method according to other embodiments of the present disclosure.

At step 302, a normally sampled second original image is downsampled to obtain a second undersampled image.

In some implementations, a normally sampled second original image can be downsampled to obtain a second downsampled image. In these implementations, the second downsampled image can be directly used as the second undersampled image.

In other implementations, a normally sampled second original image can be downsampled to obtain a second downsampled image. Then, the second downsampled image is upsampled to obtain a second upsampled image of the same size as the second original image. In these implementations, the second upsampled image can be used as the second undersampled image. Here, although the size of the second upsampled image is the same as that of the second original image, the second upsampled image is obtained by downsampling and then upsampling the second original image. In this sense, the second upsampled image is actually an undersampled image corresponding to the second original image, thus the second upsampled image can be used as the second undersampled image.

In some embodiments, the second original image may be first augmented to obtain at least one augmented image, and then the second original image and the augmented image are downsampled to obtain more than one second downsampled image. In this way, the training samples can be increased. For example, at least one augmented image can be obtained by performing at least one of the following augmentation operations: flipping, rotating, brightness adjustment, or scaling. In some examples, the second original image can be rotated by a preset angle, such as 90 degrees, 270 degrees, and the like. In other examples, the second original image may be scaled by an algorithm such as bicubic interpolation. For example, the size of the second downsampled image may be 0.6 times, 0.7 times, 0.8 times, 0.9 times, or 1.2 times of that of the second original image.

In some embodiments, the second downsampled image has a size smaller than that of the second original image in the third direction. In one case, the second downsampled image has the same size as the second original image in the fourth direction. In another case, the second downsampled image has a size smaller than that of the second original image in the fourth direction.

Assume that the second original image has a size of m (row) pixels×kn (column) pixels, and k is the number of rows of the second detectors. In a case where k is 1, for example, pixels in even columns in the second original image may be deleted, and pixels in odd columns in the second original image may be retained to obtain a second downsampled image; for another example, pixels in odd columns in the second original image may be deleted and pixels in even columns in the second original image may be retained to obtain a second downsampled image. In a case where k is greater than 1, for example, k columns of pixels in the second original image may be deleted every k columns of pixels to obtain a second downsampled image. As an example, n is an even number, and the second downsampled map may have a size of m pixels×n/2 pixels.

At step 304, the machine learning model is trained with the second undersampled image and the second original image as training samples to obtain a mapping relationship between an undersampled image and a normally sampled original image.

At step 306, a first undersampled image to be processed is acquired. For example, the first undersampled image has a smaller size than that of the first original image in the first direction.

At step 308, the first undersampled image is reconstructed to a corresponding first original image according to a mapping relationship between the undersampled image and the normally sampled original image.

In some implementations, a first undersampled image can be upsampled to obtain a first upsampled image of the same size as the first original image, and the first upsampled image is used as a third undersampled image. Then, the third undersampled image is reconstructed to a corresponding third original image according to the mapping relationship, and the third original image is used as the first original image.

For example, a first undersampled image may be upsampled by interpolation algorithms such as bicubic interpolation, nearest neighbor interpolation, bilinear interpolation, or image edge based interpolation to obtain a first upsampled image.

In the above embodiment, a machine model is first trained according to a second undersampled image and a second original image, and then a first undersampled image to be processed can be reconstructed to a corresponding first original image with the trained mapping relationship.

Figure 4:
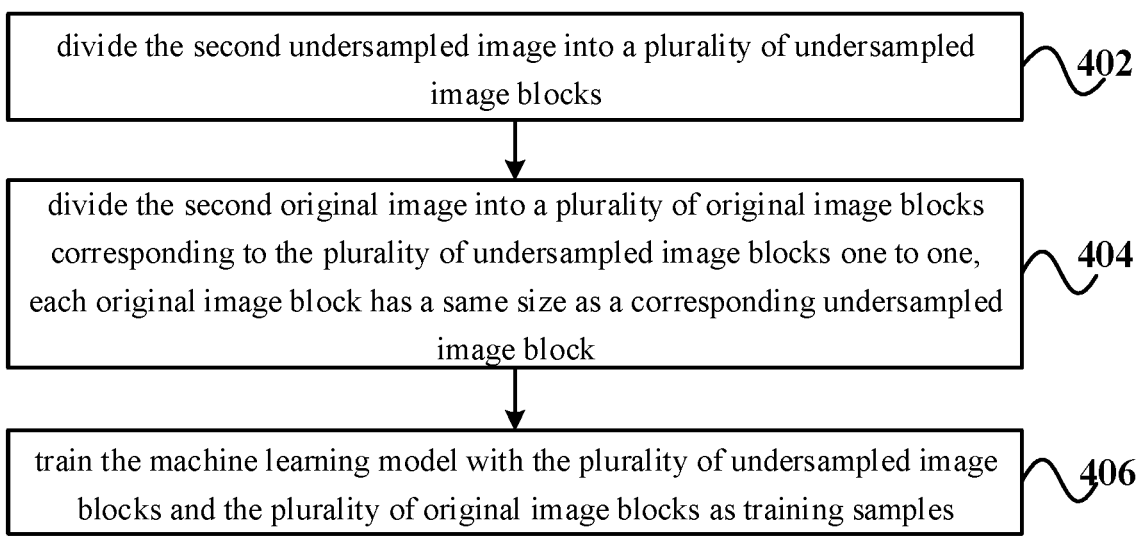
FIG. 4 is a schematic flow chart illustrating the process of training a machine learning model according to some embodiments of the present disclosure.

FIG. 4 is a schematic flow chart illustrating the process of training a machine learning model according to some embodiments of the present disclosure.

At step 402, a second undersampled image is divided into a plurality of undersampled image blocks. Herein, the second upsampled image obtained above is used as the second undersampled image.

In some embodiments, the second undersampled image can be divided into a plurality of undersampled image blocks of the same size.

At step 404, the second original image is divided into a plurality of original image blocks corresponding to the plurality of undersampled image blocks one to one. Here, one original image block corresponds to one undersampled image block. Each original image block has the same size as a corresponding undersampled image block.

For example, the second undersampled image may be divided into a plurality of undersampled image blocks of a size of m (row) pixels×m (column) pixels, and the second original image corresponding to the second undersampled image can be divided into a plurality of original image blocks of a size of m (row) pixels×m (column) pixels.

At step 406, the machine learning model is trained with the plurality of undersampled image blocks and the plurality of original image blocks as training samples.

For example, the plurality of undersampled image blocks and the plurality of original image blocks may be divided into a plurality of sets of image blocks. Each set of image blocks may comprise a predetermined number of undersampled image blocks and corresponding original image blocks. In each training of the machine learning model, one set of image blocks of the plurality of sets of image blocks can be used as training samples. In some embodiments, a set of image blocks can comprise 64 undersampled image blocks and 64 corresponding original image blocks.

Some implementations of training the machine learning model taking a convolutional neural network model as an example will be introduced.

Firstly, each undersampled image block is processed to determine a difference image block between the undersampled image block and a corresponding original image block.

For example, a convolutional neural network model can comprise 20 convolutional layers with a nonlinear layer such as a ReLu (Rectified Linear Unit) activation function between adjacent two convolutional layers. The output of each convolutional layer is used as the input to next convolutional layer after being nonlinearly processed by a nonlinear layer.

Assuming an undersampled image block input to the first convolutional layer has a size of n×n. The first convolutional layer uses 64 convolution kernels, each convolution kernel has a size of 3×3×1, and the step size is 1. The first convolutional layer outputs a feature map having a size of n×n×64. The 2nd to the 19th convolutional layers each uses 64 convolution kernels, each convolution kernel has a size of 3×3×64, and the step size is 1. Each of the 2th to the 19th convolutional layers outputs a feature map having a size of n×n×64. The 20th convolution layer uses a convolution kernel of size 3×3×64, and outputs a feature map having a size of n×n which is the same as the undersampled image block input.

image block, i.e., the feature map output by the 20th convolutional layer can be obtained by performing convolution processing on each undersampled image block by using 20 convolutional layers.

Then, the difference image block is added to the corresponding undersampled image block to obtain a predicted image block.

For example, the feature map output by the 20th convolutional layer is added to the undersampled image block input to the first convolutional layer to obtain a predicted image block corresponding to the undersampled image block.

Thereafter, the machine learning model is optimized according to the predicted image block and the original image block until the difference between the predicted image block and the original image block satisfies a preset condition.

In the training, the weights of the convolution kernels can be initialized with MSRA, and all the bias terms can be initialized to zero. A randomly selected set of image blocks can be used as training samples in each train. The goal of each training is to minimize the value of minimization loss function Loss represented by the following formula:

$$\text{Loss} = \frac{1}{2n}\sum_{i=1}^{n}\|y_i - f(x_i)\|_2^2 + \frac{\lambda}{2}\sum_{w}w^2 \circ$$

Here, n is the number of original image blocks in a set of image blocks, $y_i$ represents the original image block, $f(x_i)$ represents the predicted image block, $\lambda$ represents the regularization term coefficient, and w represents the weight of a convolution kernel. $\lambda$ may be $1\times10^{-4}$, for example.

It can be understood that the expression of $f(x_i)$ contains bias terms. Therefore, by adjusting the magnitude of the bias terms and the weights of convolution kernels, the value of Loss can be minimized, that is, satisfy a preset condition.

The Adam algorithm can be adopted for the optimization of the model. Independent learning rates can be adaptively set for the weight term and the bias term by calculating first moment estimation and second moment estimation of gradient. Compared to the stochastic gradient descent method, the Adam algorithm enables faster convergence of the minimization loss function, and there is no need to set a threshold clip_gradient to prevent gradient exploding.

In the above embodiment, a second undersampled image is divided into a plurality of undersampled image blocks, a second original image is divided into a plurality of original image blocks, and then the plurality of undersampled image blocks and the plurality of original image blocks are used as training samples to train a machine learning model. Therefore, the mapping relationship between an undersampled image and an original image obtained through training is more accurate.

Each embodiment in this description is described in a progressive manner and focuses on differences from other embodiments. For the same or similar parts of various embodiments, reference can be made to each other. As device embodiments substantially correspond to the method embodiments, a relatively simple description will be given, and reference can be made to the description of the method embodiments for relevant parts.

Figure 5:
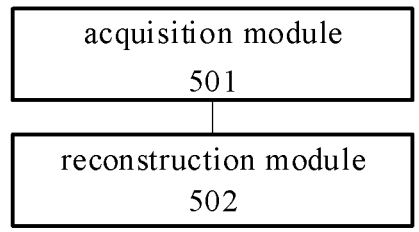
FIG. 5 is a schematic structural view showing an image processing device according to some embodiments of the present disclosure.

FIG. 5 is a schematic structural view showing an image processing device according to some embodiments of the present disclosure. As shown in FIG. 5, the device of this embodiment comprises an acquisition module 501 and a reconstruction module 502.

The acquisition module 501 is used for acquiring a first undersampled image to be processed.

In some embodiments, the first undersampled image can be obtained in the following manner: receiving, by a first group of detectors disposed opposite to a first emitter, rays emitted by the first emitter and penetrating cross sections along a second direction of a first detected object moving along a first direction; and generating the first undersampled image based on the rays received by the first group of detectors. Herein, the first direction may be substantially perpendicular to the second direction. For example, the first undersampled image has a smaller size than that of the corresponding first original image in the first direction.

The reconstruction module 502 is used for reconstructing the first undersampled image to a corresponding first original image according to a mapping relationship between an undersampled image and a normally sampled original image. Herein, the mapping relationship is obtained by training a machine learning model with a second undersampled image and a normally sampled second original image corresponding to the second undersampled image as training samples.

In some embodiments, the second original image is obtained in the following manner: receiving, by a second group of detectors disposed opposite to a second emitter, rays emitted by the second emitter and penetrating cross sections along a fourth direction of a second detected object moving along a third direction; and generating the second original image based on the rays received by the second group of detectors. Herein, the third direction may be substantially perpendicular to the fourth direction.

The above first group of detectors may comprise one or more rows of first detectors, and the above second group of detectors may comprise one or more rows of second detectors.

As some specific implementations, the first group of detectors may comprise M1 rows of first detectors arranged in the first direction, and the distance between adjacent rows of the first detectors is S1; the second group of detectors may comprise M2 rows of second detectors arranged in the third direction, and the distance between adjacent rows of the second detectors is S2. Herein, 2≤M1≤M2, S1=N×S2, and N is an integer greater than or equal to 2.

The device of the above embodiment can reconstruct a first undersampled image to be processed to a corresponding first original image using the trained mapping relationship between an undersampled image and a normally sampled original image. The first original image obtained according to the device of the above embodiment is more accurate than the conventional interpolation method.

Figure 6:
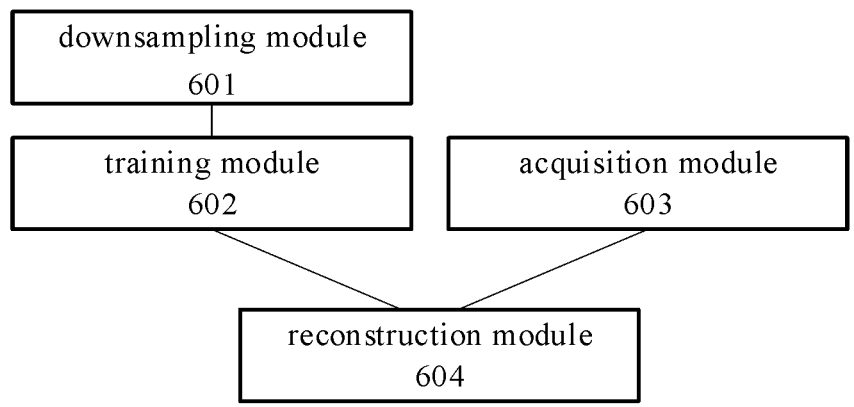
FIG. 6 is a schematic structural view showing an image processing device according to other embodiments of the present disclosure.

FIG. 6 is a schematic structural view showing an image processing device according to other embodiments of the present disclosure. As shown in FIG. 6, the device of this embodiment comprises a downsampling module 601, a training module 602, an acquisition module 603, and a reconstruction module 604.

The downsampling module 601 is used for downsampling a normally sampled second original image to obtain a second undersampled image. As some implementations, the downsampling module 601 can be used for augmenting the second original image to obtain at least one augmented image; and downsampling the second original image and the augmented image to obtain more than one second undersampled image.

The training module 602 is used for training the machine learning model with the second undersampled image and the second original image as training samples to obtain a mapping relationship between an undersampled image and a normally sampled original image.

The acquisition module 603 is used for acquiring a first undersampled image to be processed.

The reconstruction module 604 is used for reconstructing the first undersampled image to a corresponding first original image according to the mapping relationship between an undersampled image and a normally sampled original image.

The device of the above embodiment first trains a machine model according to the second undersampled image and the second original image, and then a first undersampled image to be processed can be reconstructed to a corresponding first original image with the trained mapping relationship.

Figure 7:
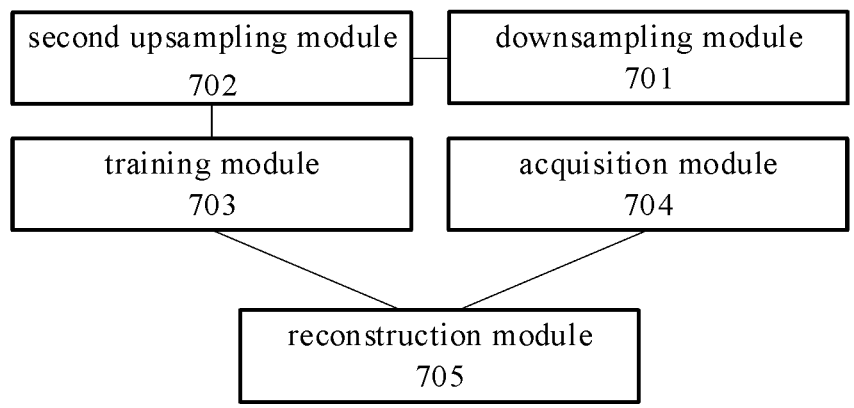
FIG. 7 is a schematic structural view showing an image processing device according to other embodiments of the present disclosure.

FIG. 7 is a schematic structural view showing an image processing device according to other embodiments of the present disclosure. As shown in FIG. 7, the device of this embodiment comprises a downsampling module 701, a second upsampling module 702, a training module 703, an acquisition module 704, and a reconstruction module 705.

The downsampling module 701 is used for downsampling a normally sampled second original image to obtain a second downsampled image. For example, the second downsampled image has a smaller size than that of the second original image in the third direction.

The second upsampling module 702 is used for upsampling the second downsampled image to obtain a second upsampled image of the same size as the second original image, the second upsampled image is used as a second undersampled image.

The training module 703 is used for training a machine learning model by using the second undersampled image and the second original image as training samples to obtain a mapping relationship between an undersampled image and a normally sampled original image.

The acquisition module 704 is used for acquiring a first undersampled image to be processed.

The reconstruction module 705 is used for reconstructing the first undersampled image to a corresponding first original image according to a mapping relationship between an undersampled image and a normally sampled original image.

Figure 8:
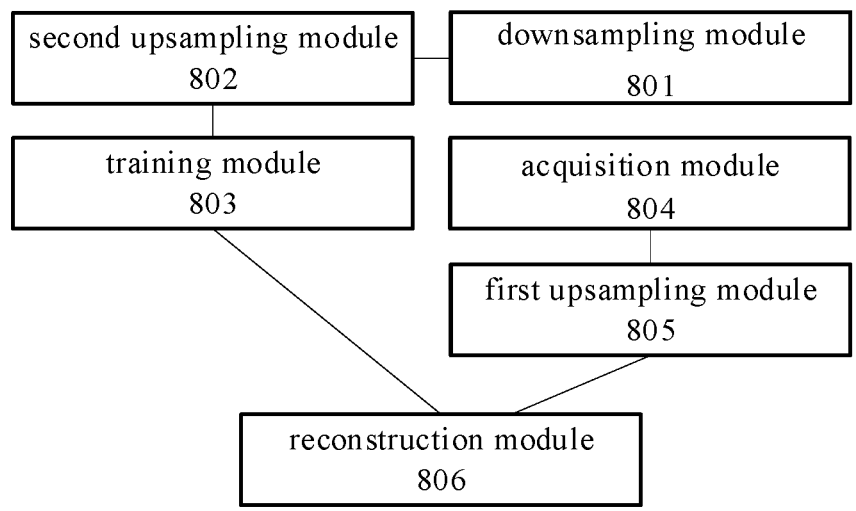
FIG. 8 is a schematic structural view showing an image processing device according to still other embodiments of the present disclosure.

FIG. 8 is a schematic structural view showing an image processing device according to still other embodiments of the present disclosure. As shown in FIG. 8, the device of this embodiment comprises a downsampling module 801, a second upsampling module 802, a training module 803, an acquisition module 804, a first upsampling module 805 and a reconstruction module 806.

The downsampling module 801 is used for downsampling a normally sampled second original image to obtain a second downsampled image. The second upsampling module 802 is used for upsampling the second downsampled image to obtain a second upsampled image of the same size as the second original image, the second upsampled image is used as the second undersampled image. The training module 803 is used for training a machine learning model with the second undersampled image and the second original image as training samples to obtain a mapping relationship between an undersampled image and a normally sampled original image. The acquisition module 804 is used for acquiring a first undersampled image to be processed. The first upsampling module 805 is used for upsampling the first undersampled image to obtain a first upsampled image of the same size as the first original image, and the first upsampled image is used as the third undersampled image. The reconstruction module 806 is used for reconstructing the third undersampled image to a corresponding third original image according to the trained mapping relationship, and the third original image is used as a first original image corresponding to the first undersampled image.

As some implementations, the training module 703 in FIG. 7 and the training module 803 in FIG. 8 can be used for dividing the second undersampled image into a plurality of undersampled image blocks; dividing the second original image into a plurality of original image blocks corresponding to the plurality of undersampled image blocks one to one, each original image block has the same size as the corresponding undersampled image block; training the machine learning model with the plurality of undersampled image blocks and the plurality of original image blocks as training samples.

As some implementations, the training module 703 and the training module 803 can be used for processing each of the plurality of undersampled image blocks to determine a difference image block between each undersampled image block and a corresponding original image block; adding the difference image block to the corresponding undersampled image block to obtain a predicted image block; optimizing the machine learning model according to the predicted image block and the corresponding original image block until a difference between the predicted image block and the corresponding original image block satisfies a preset condition.

In the above implementation, the second undersampled image is divided into a plurality of undersampled image blocks, the second original image is divided into a plurality of original image blocks, and then the plurality of undersampled image blocks and the plurality of original image blocks are used as training samples to train a machine learning model. Therefore, the mapping relationship between an undersampled image and an original image obtained through training is more accurate.

Figure 9:
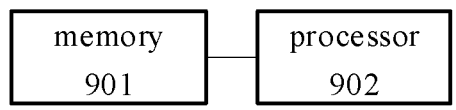
FIG. 9 is a schematic structural view showing an image processing device according to yet other embodiments of the present disclosure.

FIG. 9 is a schematic structural view showing an image processing device according to yet other embodiments of the present disclosure. As shown in FIG. 9, the device of this embodiment comprises a memory 901 and a processor 902. The memory 901 may be a magnetic disk, flash memory or any other non-volatile storage medium. The memory 901 is used to store instructions corresponding to the method of any one of the above embodiments. The processor 902 is coupled to the memory 901 and may be implemented as one or more integrated circuits, such as a microprocessor or a microcontroller. The processor 902 is used to execute the instructions stored in the memory 901.

Figure 10:
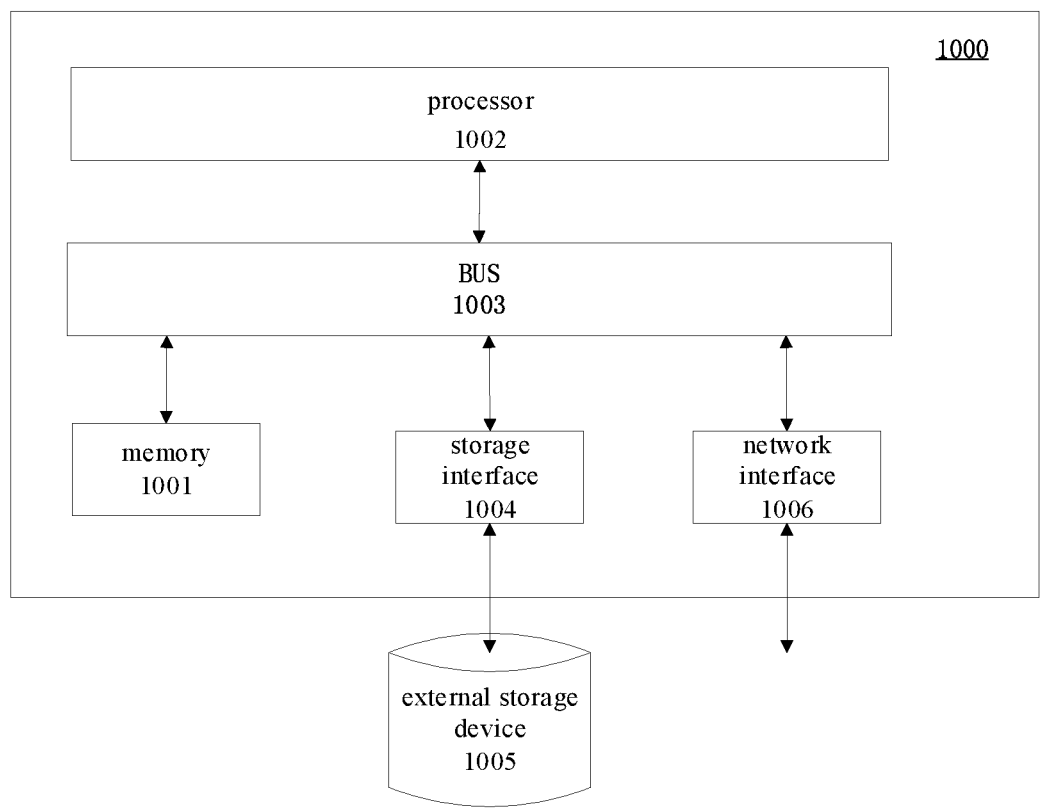
FIG. 10 is a schematic structural diagram of an image processing device according to yet other embodiments of the present disclosure.

FIG. 10 is a schematic structural diagram of an image processing device according to yet other embodiments of the present disclosure. As shown in FIG. 10, the device 1000 of this embodiment comprises memory 1001 and a processor 1002. The processor 1002 is coupled to the memory 1001 via a BUS 1003. The device 1000 may be further connected to an external storage device 1005 through a storage interface 1004 to access external data, and may be further connected to a network or another computer system (not shown) through a network interface 1006.

The solutions provided by the embodiments of the present disclosure may be applied to a variety of scenarios, and three exemplary application scenarios are described below.

<First Application Scenario>

A second original image and a first undersampled image are obtained by using the same quick check system. For example, the quick check system may comprise a single row or a plurality of rows of detectors, and each row of the plurality of rows of detectors may be sequentially arranged in the moving direction of a detected object. In this application scenario, the detected object moves too fast when passing through the quick check system, which results in the generation of the first undersampled image.

The solution of the present disclosure allows a first undersampled image to be reconstructed to a normally sampled first original image without increasing the emission frequency of rays emitted by the emitter. Therefore, the detected object can pass the quick check system at a faster speed, ensuring the passing rate of the detected object.

<Second Application Scenario>

A second original image and a first undersampled image are obtained by using different quick check systems. For example, the second original image is obtained by using a first quick check system including 8 rows of detectors, and the first undersampled image to be processed is obtained by using a second quick check system including 4 rows of detectors. Here, the distance between adjacent rows of detectors of the second quick check system may be twice the distance between adjacent rows of detectors of the first quick check system.

Assume that the image data obtained by 8 rows of detectors is xxxxxxxx, the image data obtained by 4 rows of detectors can be expressed as xoxoxoxo or oxoxoxox (x indicates presence of data, o indicates absence of data). The number of columns of the image data obtained by using 4 rows of detectors is half of that obtained by using 8 rows of detectors. Thus, the image obtained by using 4 rows of detectors is an undersampled image.

The first undersampled image can be reconstructed to a normally sampled first original image by using the solution of the present disclosure. Therefore, the solution of the present disclosure can reduce the number of rows of detectors while ensuring image accuracy, and thereby reduce hardware costs.

<Third Application Scenario>

A second original image and a first undersampled image are obtained by using different quick check systems. For example, the second original image is obtained by using a first quick check system including 4 rows of detectors, and the first undersampled image to be processed is obtained by using a second quick check system including 4 rows of detectors. The distance between adjacent rows of detectors of the second quick check system may be twice the distance between adjacent rows of detectors of the first quick check system. Thus, an undersampled image will be obtained by the second quick check system.

The first undersampled image can be reconstructed to a first normally sampled original image by using the solution of the present disclosure. Since the distance between adjacent rows of detectors of the second quick check system is twice the distance between adjacent rows of detectors of the first quick check system, the moving speed of the detected object can be improved, and the passing rate of the detected object can be improved.

One skilled in the art should understand that, the embodiments of the present disclosure may be provided as a method, a device, or a computer program product. Therefore, embodiments of the present disclosure can take the form of an entirely hardware embodiment, an entirely software embodiment or an embodiment combining both hardware and software. Moreover, the present disclosure may take the form of a computer program product embodied on one or more computer-usable non-transitory storage media (including but not limited to disk storage, CD-ROM, optical memory, etc.) having computer-usable program code embodied therein.

The present disclosure is described with reference to flowcharts and/or block diagrams of methods, devices (systems) and computer program products according to embodiments of the present disclosure. It should be understood that each process in the flowcharts and/or the functions specified in one or more blocks of the block diagrams may be implemented by computer program instructions. The computer program instructions may be provided to a processor of a general purpose computer, a special purpose computer, an embedded processor, or other programmable data processing device to generate a machine, making the instructions executed by a processor of a computer or other programmable data processing device generate means implementing the functions specified in one or more flows of the flowcharts and/or one or more blocks of the block diagrams.

The computer program instructions may also be stored in a computer readable memory device capable of directing a computer or other programmable data processing device to operate in a specific manner such that the instructions stored in the computer readable memory device produce an article of manufacture including an instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

The method and device of the present disclosure may be implemented in many ways. For example, the method and device of the present disclosure may be implemented by software, hardware, firmware, or any combination of software, hardware, and firmware. The above sequence of steps of the method is merely for the purpose of illustration, and the steps of the method of the present disclosure are not limited to the above-described specific order unless otherwise specified. In addition, in some embodiments, the present disclosure may also be implemented as programs recorded in a recording medium, which comprise machine-readable instructions for implementing the method according to the present disclosure.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. An image processing method comprising:
   acquiring a first undersampled image to be processed; and
   reconstructing, according to a mapping relationship between an undersampled image and a normally sampled original image, the first undersampled image to a corresponding first original image, wherein the mapping relationship is obtained by training a machine learning model with a second undersampled image and a normally sampled second original image corresponding to the second undersampled image as training samples;
   the image processing method further comprises:
   downsampling the second original image to obtain the second undersampled image, comprising:
   downsampling the second original image to obtain a second downsampled image, and
   upsampling the second downsampled image to obtain a second upsampled image of the same size as the second original image, wherein the second upsampled image is used as the second undersampled image; and
   training the machine learning model with the second undersampled image and the second original image as training samples to obtain the mapping relationship.

2. The image processing method according to claim 1, wherein reconstructing the first undersampled image to a corresponding first original image comprises:
   upsampling the first undersampled image to obtain a first upsampled image of the same size as the first original image, wherein the first upsampled image is used as a third undersampled image;
   reconstructing the third undersampled image to a corresponding third original image according to the mapping relationship, wherein the third original image is used as the first original image.

3. The image processing method according to claim 1, wherein training the machine learning model with the second undersampled image and the second original image as training samples to obtain the mapping relationship comprises:

dividing the second undersampled image into a plurality of undersampled image blocks;

dividing the second original image into a plurality of original image blocks corresponding to the plurality of undersampled image blocks one to one, wherein each original image block has a same size as a corresponding undersampled image block;

training the machine learning model with the plurality of undersampled image blocks and the plurality of original image blocks as training samples.

4. The image processing method according to claim 3, wherein training the machine learning model with the plurality of undersampled image blocks and the plurality of original image blocks as training samples comprises:

processing each undersampled image block to determine a difference image block between the undersampled image block and a corresponding original image block;

adding the difference image block to the undersampled image block to obtain a predicted image block;

optimizing the machine learning model according to the predicted image block and the corresponding original image block until a difference between the predicted image block and the corresponding original image block satisfies a preset condition.

5. The image processing method according to claim 1, wherein:

the first undersampled image is obtained in the following manner:

receiving, by a first group of detectors disposed opposite to a first emitter, rays emitted by the first emitter and penetrating cross sections along a second direction of a first detected object moving along a first direction; and generating the first undersampled image based on the rays received by the first group of detectors, wherein the first direction is perpendicular to the second direction, and the first group of detectors comprises one or more rows of first detectors; and the second original image is obtained in the following manner:

receiving, by a second group of detectors disposed opposite to a second emitter, rays emitted by the second emitter and penetrating cross sections along a fourth direction of a second detected object moving along a third direction; and generating the second original image based on the rays received by the second group of detectors, wherein the third direction is perpendicular to the fourth direction, and the second group of detectors comprises one or more rows of second detectors.

6. The image processing method according to claim 5, wherein:

the first undersampled image has a size smaller than that of the first original image in the first direction;

the second downsampled image has a size smaller than that of the second original image in the third direction.

7. The image processing method according to claim 5, wherein:

the first group of detectors comprises M1 rows of first detectors arranged in the first direction, wherein the distance between adjacent rows of first detectors is S1;

the second group of detectors comprises M2 rows of second detectors arranged in the third direction, wherein the distance between adjacent rows of second detectors is S2;

wherein $2 \leq M1 \leq M2$, $S1 = N \times S2$, and N is an integer greater than or equal to 2.

8. An image processing device, comprising:

a memory; and a processor coupled to the memory, the processor is configured to, based on instructions stored in the memory, carry out the image processing method according to claim 1.

9. The image processing device according to claim 8, wherein reconstructing the first undersampled image to a corresponding first original image comprises:

upsampling the first undersampled image to obtain a first upsampled image of the same size as the first original image, wherein the first upsampled image is used as a third undersampled image;

reconstructing the third undersampled image to a corresponding third original image according to the mapping relationship, wherein the third original image is used as the first original image.

10. The image processing device according to claim 8, wherein training the machine learning model with the second undersampled image and the second original image as training samples to obtain the mapping relationship comprises:

dividing the second undersampled image into a plurality of undersampled image blocks;

dividing the second original image into a plurality of original image blocks corresponding to the plurality of undersampled image blocks one to one, wherein each original image block has a same size as a corresponding undersampled image block;

training the machine learning model with the plurality of undersampled image blocks and the plurality of original image blocks as training samples.

11. The image processing device according to claim 10, wherein training the machine learning model with the plurality of undersampled image blocks and the plurality of original image blocks as training samples comprises:

processing each undersampled image block to determine a difference image block between the undersampled image block and a corresponding original image block;

adding the difference image block to the undersampled image block to obtain a predicted image block;

optimizing the machine learning model according to the predicted image block and the corresponding original image block until a difference between the predicted image block and the corresponding original image block satisfies a preset condition.

12. The image processing device according to claim 8, wherein:

the first undersampled image is obtained in the following manner:

receiving, by a first group of detectors disposed opposite to a first emitter, rays emitted by the first emitter and penetrating cross sections along a second direction of a first detected object moving along a first direction; and generating the first undersampled image based on the rays received by the first group of detectors, wherein the first direction is perpendicular to the second direction, and the first group of detectors comprises one or more rows of first detectors; and the second original image is obtained in the following manner:

receiving, by a second group of detectors disposed opposite to a second emitter, rays emitted by the second emitter and penetrating cross sections along a fourth direction of a second detected object moving along a third direction; and generating the second original image based on the rays received by the second group of detectors, wherein the third direction is perpendicular to the fourth direction, and the second group of detectors comprises one or more rows of second detectors.

13. The image processing device according to claim 12, wherein:

the first undersampled image has a size smaller than that of the first original image in the first direction;

the second downsampled image has a size smaller than that of the second original image in the third direction.

14. The image processing device according to claim 13, wherein:

the first group of detectors comprises M1 rows of first detectors arranged in the first direction, wherein the distance between adjacent rows of first detectors is S1;

the second group of detectors comprises M2 rows of second detectors arranged in the third direction, wherein the distance between adjacent rows of second detectors is S2;

wherein $2 \leq M1 \leq M2$, $S1=N \times S2$, and N is an integer greater than or equal to 2.

15. A nonvolatile computer-readable storage medium on which computer program instructions are stored, the instructions, when executed by a processor, implement the image processing method according to claim 1.

16. The nonvolatile computer-readable storage medium according to claim 15, wherein reconstructing the first undersampled image to a corresponding first original image comprises:

upsampling the first undersampled image to obtain a first upsampled image of the same size as the first original image, wherein the first upsampled image is used as a third undersampled image;

reconstructing the third undersampled image to a corresponding third original image according to the mapping relationship, wherein the third original image is used as the first original image.

17. The nonvolatile computer-readable storage medium according to claim 15, wherein training the machine learning model with the second undersampled image and the second original image as training samples to obtain the mapping relationship comprises:

dividing the second undersampled image into a plurality of undersampled image blocks;

dividing the second original image into a plurality of original image blocks corresponding to the plurality of undersampled image blocks one to one, wherein each original image block has a same size as a corresponding undersampled image block;

training the machine learning model with the plurality of undersampled image blocks and the plurality of original image blocks as training samples.

18. An image processing method, comprising:

acquiring a first undersampled image to be processed; and reconstructing, according to a mapping relationship between an undersampled image and a normally sampled original image, the first undersampled image to a corresponding first original image, wherein the mapping relationship is obtained by training a machine learning model with a second undersampled image and a normally sampled second original image corresponding to the second undersampled image as training samples:

the image processing method further comprises:

downsampling the second original image to obtain the second undersampled image; and training the machine learning model with the second undersampled image and the second original image as training samples to obtain the mapping relationship;

wherein downsampling the second original image comprises:

augmenting the second original image to obtain at least one augmented image;

downsampling the second original image and the augmented image to obtain more than one second undersampled image.

19. An image processing device, comprising:

a memory; and a processor coupled to the memory, the processor is configured to, based on instructions stored in the memory, carry out the image processing method according to claim 18.

20. A nonvolatile computer-readable storage medium on which computer program instructions are stored, the instructions, when executed by a processor, implement the image processing method according to claim 18.

* * * * *